3,150,163
PENTAFLUOROBENZONITRILE AND METHOD OF MAKING THE SAME

Walter J. Pummer, Rockville, Md., and Leo A. Wall, Washington, D.C., assignors to the United States of America as represented by the Secretary of the Navy
No Drawing. Original application May 3, 1960, Ser. No. 26,660, now Patent No. 3,046,313, dated July 24, 1962. Divided and this application June 26, 1961, Ser. No. 126,450

1 Claim. (Cl. 260—465)

(Granted under Title 35, U.S. Code (1952), sec. 266)

The invention described herein may be manufactured and used by or for the Government of the United States of America for governmental purposes without the payment of any royalties thereon or therefor.

This application is a division of application Serial Number 26,660, filed May 3, 1960, now Patent No. 3,046,313.

This invention relates to perfluorobenzonitrile and a method of making the same. The product is one of a family of compounds containing the pentafluorophenyl group. Compounds containing the pentafluorophenyl group are useful as intermediates or precursors for thermal-stable or fuel-resistant polymers or lubricating liquids.

An object of the invention is the preparation of pentafluorobenzonitrile.

Other objects and many of the attendant advantages of this invention will be readily appreciated as the same becomes better understood by reference to the following detailed description.

The methods of the invention include the Grignard coupling or addition reaction and the Ullmann-type condensation. The following scheme illustrates some of these reactions as applied to the making of pentafluorobenzonitrile and other compounds of the family.

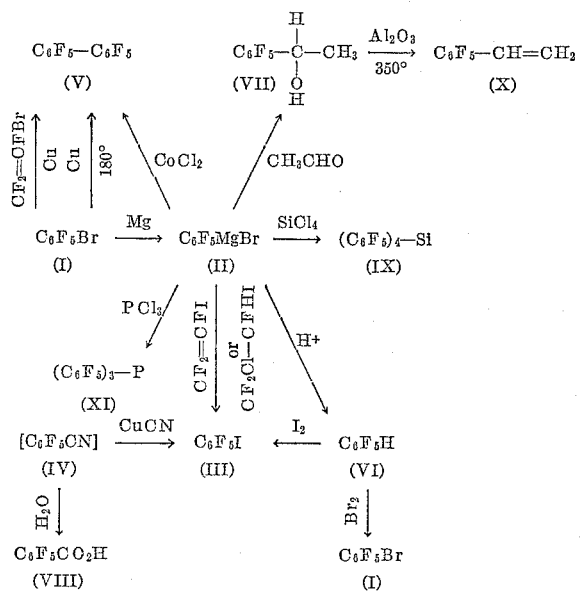

One of the compounds of this family is pentafluoroiodobenzene. Since this compound contains a labile iodine atom, it can be used to synthesize numerous new aromatic fluorocarbons containing the perfluorophenyl ($C_6F_5$), grouping. In accordance with the invention described in the parent application, pentafluoroiodobenzene ($C_6F_5I$) can be prepared by any one of three different methods.

Pentafluoroiodobenzene From Pentafluorobromobenzene and 1,1,2-Trifluoro-1-Chloro-2-Iodoethane A Grignard reagent is prepared in the following manner. To 1 g. (0.041 g. atom) of magnesium turnings in 10 ml. of anhydrous ether is added 1 ml. of pentafluorobromobenzene (I) and a small crystal of iodine. Local heating is applied since it is necessary to initiate the reaction. When the reaction is sufficiently in progress, the flask containing the ingredients is cooled in an ice water bath and the remainder of the compound (I) (total 10 g., 0.04 mole) is added over a half-hour period. The Grignard solution is dark brown in color. When all the magnesium appears to be consumed, the solution is allowed to come to room temperature and is stirred for an additional half hour.

To the refluxing Grignard reagent solution (II), prepared from 10 g. (0.04 mole) of pentafluorobromobenzene (I), as just described, is added 9.76 g. (0.04 mole) of 1,1,2-trifluoro-1-chloro-2-iodoethane in 5 ml. of anhydrous ether. No noticeable heat effect is observed. The solution is refluxed for 3 hours. At the end of this time, a black solid appears on the sides of the flask in which the reaction is conducted. The mixture is allowed to stand at room temperature overnight and is finally decomposed by the addition of 50 ml. of 6 N hydrochloric acid. The ether layer is separated, dried ($Na_2SO_4$), and distilled. There is obtained 5.78 g. (50%) of pentafluoroiodobenzene (III), B.P. 77° to 78°/35 mm., $n_D^{20}$=1.4990. Mass spectrometer analysis of this product shows it to be 98% pure.

Pentafluoroiodobenzene From Pentafluorobromobenzene and Trifloroiodoethene

To the Grignard reagent solution (II) prepared from 10 g. (0.04 mole) of pentafluorobromobenzene (I) as previously described, maintained at 0° C. by means of an ice bath, is added 12.4 g. (0.06 mole) of trifluoroiodoethene. The solution is stirred for one hour more and then refluxed for two hours. Decomposition is effected in the usual fashion. Distillation of the residue, after removal of the ether, yields 1 g. of pentafluoroiodobenzene (III) as well as some pentafluorobenzene (VI) and some unreacted pentafluorobromobenzene (I).

Pentafluoroiodobenzene From Iodination of Pentafluorobenzene

Pentafluoroiodobenzene can be prepared by iodination of pentafluorobenzene is 65% oleum as well as by the two previously described processes. To 200 g. (1.5 moles) of iodine and 1 kg. of 65% oleum, after stirring for one hour at room temperature, is added 255 g. of reduced hexafluorobenzene (a mixture containing 45% of hexafluorobenzene, 40% of pentafluorobenzene, and 10% of tetrafluorobenzene). The mixture is stirred for four hours at 55° to 60° C. It is allowed to come to room temperature overnight. The flask is cooled in an ice bath, and gradually 1 liter of ice water is added. It is diluted further with another liter of ice water, then decolorized with aqueous sodium bisulfite, and the products (177 g.) separated. After drying ($Na_2SO_4$) and distillation, there is obtained 36 g. of pentafluoroiodobenzene (B.P. 73° to 75°/35 mm., $n_D^{20}$ =1.4990). In addition are obtained some unreacted hexafluorobenzene and some higher iodinated fluorobenzenes.

*Analysis.*—Calculated for $C_6F_5I$: C, 24.5; I, 43.1. Found: C, 24.7; I, 42.1.

Pentafluorobenzonitrile

The compound of the invention is pentafluorobenzonitrile ($C_6F_5CN$). This compound (IV) is obtained from the reaction of pentafluoroiodobenzene and cuprous cyanide. Once the reaction is initiated, the products are immediately removed by vacuum distillation. This procedure leads to fair yield of pentafluorobenzonitrile, based on its hydrolysis product, pentafluorobenzoic acid (VIII).

Pentafluorobenzonitrile, being a precursor of pentafluorobenzoic acid, is thus also a precursor of phenyl pentafluorobenzoate, which is a stable fluid, not readily dissolving hydrocarbon polymers or swelling rubber.

*Pentafluorobenzonitrile (IV) From Pentafluoroiodobenzene (III)*

Five grams (0.017 mole) of pentafluoroiodobenzene (III), 1.6 g. (0.009 mole) of cuprous cyanide, and 1.34 g. (0.017 mole) of pyridine are placed in a small flask and gradually heated. The contents begins to darken with increasing temperature. At 150° C. the contents is a black viscous liquid. This temperature is maintained for 5 minutes more. The flask is allowed to cool to 100° C., and the apparatus is rearranged for distillation. The products are removed under reduced pressure obtained by a water aspirator. There is obtained 3.07 g. of yellow liquid, B.P. 185° to 190° C., $n_D^{23.8} = 1.4764$. The liquid, on standing, gradually turns brown and probably contains some unreacted starting material (III). To show that the pentafluorobenzonitrile (IV) has indeed formed, the following procedure can be undertaken. Half of the above liquid, 1.5 g., is hydrolyzed with 75% sulfuric acid at 180° C. Upon pouring on ice, followed by an ether extraction and removal of the solvent, there is obtained 0.2 g. (16%, based on reacted material) of pentafluorobenzoic acid (VIII), M.P. 101° to 103° (reported M.P. 104° to 105°). There is obtained 0.4 g. of unreacted starting material.

Obviously many modifications and variations of the present invention are possible in the light of the above teachings. It is therefore to be understood that within the scope of the appended claim the invention may be practiced otherwise than as specifically described.

What is claimed is:
Pentafluorobenzonitrile.

References Cited in the file of this patent
UNITED STATES PATENTS

| | | |
|---|---|---|
| 2,195,076 | Braun et al. | Mar. 26, 1940 |
| 2,425,426 | Joyce | Aug. 12, 1947 |

OTHER REFERENCES

Bredig: C.A., 24 (1930), p. 4440.
Gol'der et al.: C.A., 48 (1954), p. 6192.
Nield et al.: C.A., 53 (1959), p. 9127.